(No Model.)
R. STANHOPE.
REIN SUPPORTER.
No. 530,134. Patented Dec. 4, 1894.
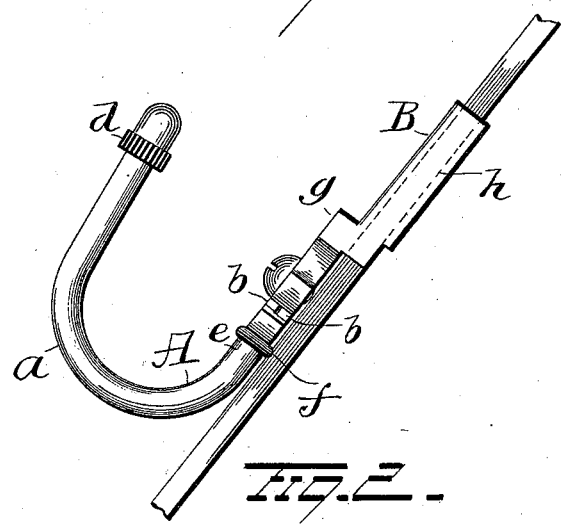
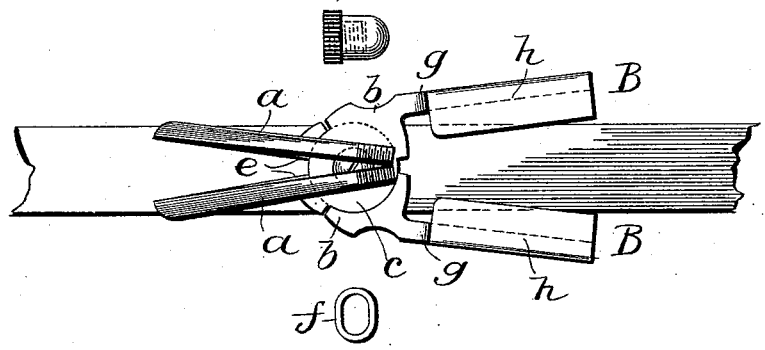
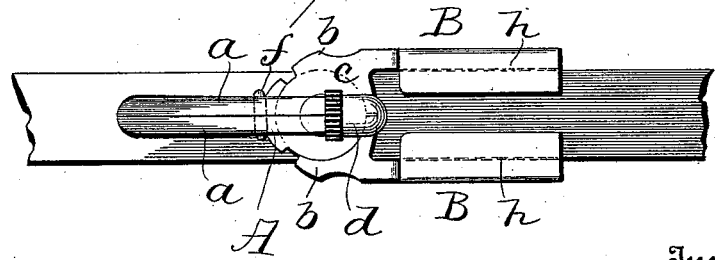
Witnesses
C. J. Nottingham
G. F. Downing
Inventor
R. Stanhope
By H. A. Seymour
Attorney

UNITED STATES PATENT OFFICE.

REDINGTON STANHOPE, OF LINCOLN, NEBRASKA.

REIN-SUPPORTER.

SPECIFICATION forming part of Letters Patent No. 530,134, dated December 4, 1894.

Application filed May 17, 1894. Serial No. 511,565. (No model.)

*To all whom it may concern:*

Be it known that I, REDINGTON STANHOPE, a resident of Lincoln, in the county of Lancaster and State of Nebraska, have invented certain new and useful Improvements in Rein-Supporters; and I do hereby declare the following to be a full, clear, and exact description of the invention, such as will enable others skilled in the art to which it appertains to make and use the same.

My invention relates to an improvement in rein supporters,—the object of the invention being to produce a simple, cheap and efficient device for preventing the reins from dropping down over the hips of the horse.

A further object is to construct the device in such manner that it can be easily and quickly applied to the hip straps of a harness without the necessity of detaching the same from other parts of the harness, or so that it can be applied to the hip straps even when the harness is on the horse.

With these objects in view the invention consists in certain novel features of construction and combinations and arrangements of parts as hereinafter set forth and pointed out in the claims.

In the accompanying drawings, Figure 1 is a view of my improved supporter, showing its application to the hip strap of a harness. Fig. 2 is a view illustrating details of the device. Fig. 3 is a plan view.

A represents a hook, which, when in position on the hip strap of a harness opens upwardly so as to receive the reins and prevent them from falling over the hips of the horse. The hook A, is made in two parts $a$, $a$, provided at their inner ends with parallel plates $b$, $b$, which are pivoted together in such manner as to produce a rule joint $c$. The free end of the hook is screw threaded for the reception of a nut $d$, which serves to normally retain the parts of the hook close together or in contact with each other. The shank or inner end $e$ of the hook is preferably made slightly tapering, for the reception of an elongated collar $f$, which serves to retain the parts of the hook firmly together and to assist in clamping the device on the hip strap of the harness as will be presently explained.

Projecting upwardly from the plates $b$ of the rule joint, are lugs $g$, and secured to or made integral with the inner faces of these lugs, are two clamping jaws B, B, adapted to receive the hip strap between them, each jaw being made with a groove $h$ for the reception of the edges of said strap. Thus it will be seen that, the jaws are in a different plane from the hook and the rule joint of its parts so that, when the device is placed in position, the hook will lie parallel with the strap.

From the construction and arrangement of parts above described it will be seen that by removing the nut $d$ and collar $f$ the hook may be opened and the jaws B, B, separated for the reception of the strap between them and that when placed in position on the strap, the closing of the hook will cause the strap to be embraced by the clamping jaws. The elongated collar $f$ will then be placed on the hook and moved up on the tapering inner end $e$ thereof, a sufficient distance to cause the strap to be tightly clamped between the said jaws, when the device will be ready for use. The nut $d$ will then be placed in position as shown in Fig. 1.

My improvements are very simple in construction, cheap to manufacture and effectual, in all respects, in the performance of their functions.

Slight changes might be made in the details of construction of my invention without departing from the spirit thereof or limiting its scope and hence I do not wish to limit myself to the precise details of construction herein set forth, but Having fully described my invention, what I claim as new, and desire to secure by Letters Patent, is—

1. A rein supporter made in the form of a hook and comprising two parts hinged together at or near the center one end of said parts constituting a clamp adapted to receive and hold a strap between them whereby the supporter is fastened in place on the harness, and means on the hook portion for holding the supporter in its closed position, substantially as set forth.

2. In a rein supporter, the combination with a hook made in two parts hinged together, of a clamping jaw projecting from each part of the hook and adapted to receive a strap between them, and a collar adapted to be placed on said hook to retain the parts together and the clamps in clamped position on the strap, substantially as set forth.

3. In a rein supporter, the combination with a hook made in two sections hinged together, the inner end or shank of said hook being made slightly tapering, of a clamping jaw having a groove, projecting from each part of the hook and adapted to receive a strap between them, and an elongated collar placed on the tapering portion of the hook for retaining the hook closed and the clamps clamped to the strap, substantially as set forth.

In testimony whereof I have signed this specification in the presence of two subscribing witnesses.

REDINGTON STANHOPE.

Witnesses:
 CHAS. L. HALL,
 H. H. DORSEY.